United States Patent Office 3,426,827
Patented Feb. 11, 1969

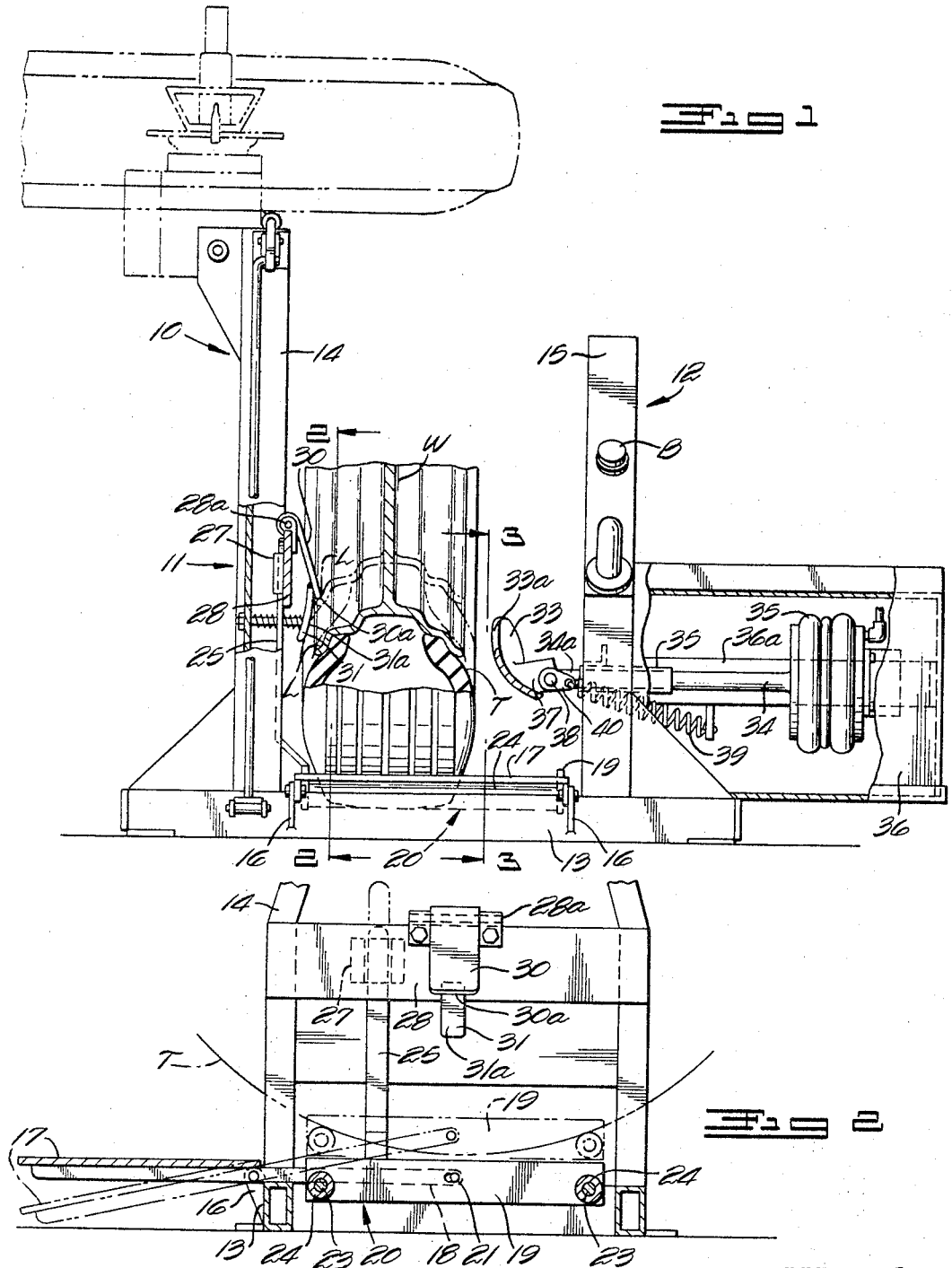

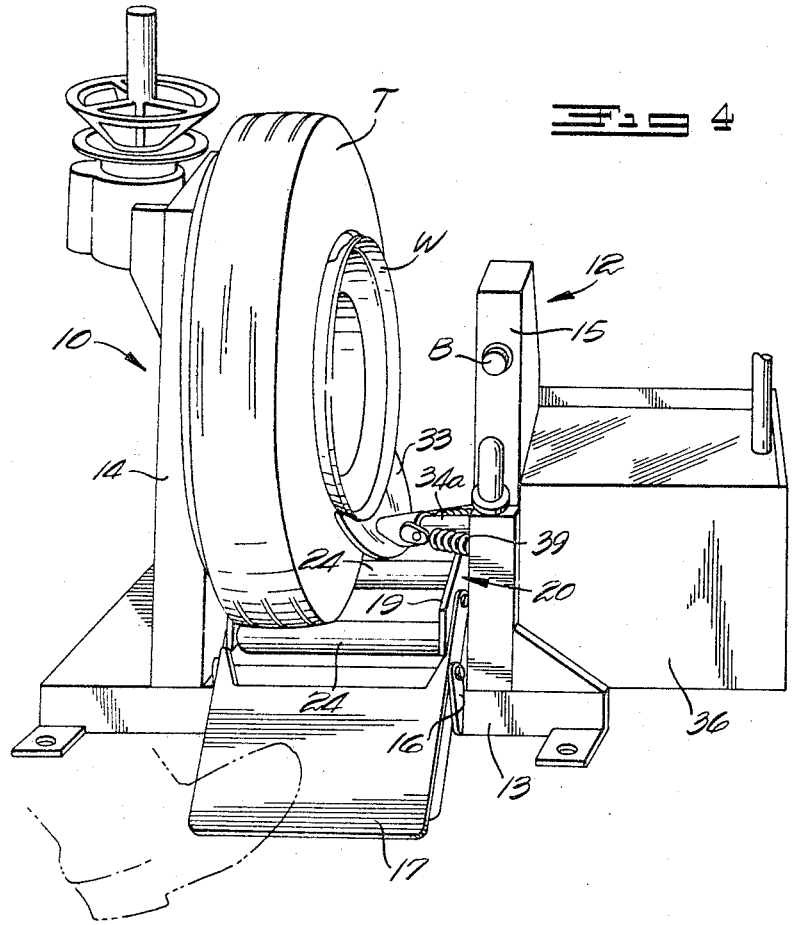
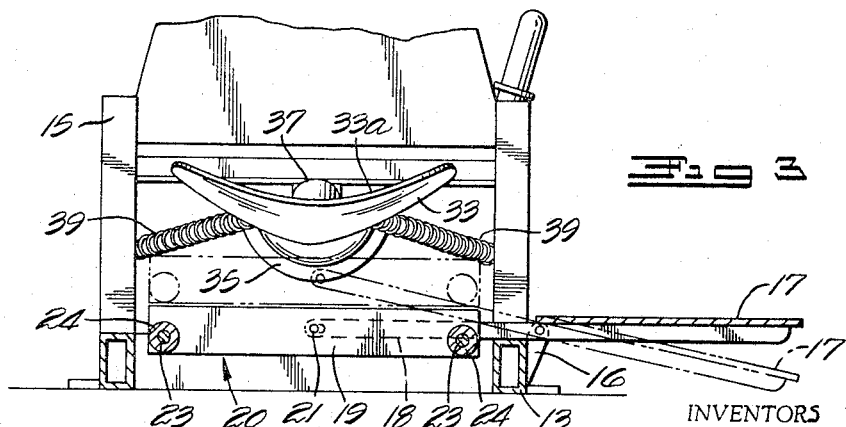

3,426,827
TIRE-CHANGING MACHINE
Harry H. Whited, 1314 Midland Ave., Barberton, Ohio 44203, and John E. Lydle, P.O. Box 1094, Akron, Ohio 44309
Filed Nov. 18, 1966, Ser. No. 595,460
U.S. Cl. 157—1.26
Int. Cl. B60c 25/06
9 Claims This invention relates to pneumatic tire-changing machines, and particularly relates to a machine for breaking the seal between tire beads and the wheel rim seats thereof.

The present invention contemplates provision of a device in which tire and rim assemblies of varying sizes may easily be rolled from the floor into relatively fixed position of vertical and lateral adjustment with respect to a horizontally movable tire-bead loosening tool, whereby a given assembly automatically may be backed and supported at one side thereof for rapid reciprocation of the tool against the tire sidewall at the opposite side of the assembly, quickly and effectively to release the tire bead from its rim seat.

In the past a number of devices have been provided for releasing the beads of pneumatic tires from the bead seats of wheel rims, including those having safety locking ridges. The simpler, less expensive, manually operated types of these devices, however, required that the wheel and tire assemblies be supported flatwise on a base of the device which, in turn, required that the cumbersome assemblies be manually lifted and otherwise handled with back-straining effort. The most commonly used devices or procedures required that the wheel assembly be supported flatwise on a floor, and consequently required even more back-breaking, bending effort on the part of the operator. The more complicated bead-breaking machines were expensive, and generally required considerable manual lifting of the wheel and tire assemblies. Light truck tires were particularly heavy and cumbersome to handle manually.

One object of the present invention is to provide a simple, compact tire-changing machine for breaking the beads of tires on wheel rims for subsequent removal of the tires therefrom without the necessity of the operator having to lift the assembly bodily.

Another object of the invention is to provide a machine of the character described which is self-operating to adjust to various sizes of tires prior to a bead-breaking operation thereof.

Another object of the invention is to provide an improved machine of the character described, within which tire and wheel assemblies a wide range of varying sizes can readily be moved into given upright positions by which each wheel is automatically gauged and adjusted according to tire and rim sizes for accurate actuation of a power-operated, bead-engaging tool to release the respective tire bead from locked or sealed position on its rim seat.

Another object of the invention is to provide an improved machine of the character described, which does not require the wheel to be clamped or locked in bead-releasing position and in which, therefore, wheel and tire assemblies can be freely rolled into and out of bead-releasing positions.

Other objects of the invention will be manifest from the following brief description and the accompanying drawings.

Of the accompanying drawings:

FIGURE 1 is a front elevation of a tire-changing machine embodying the features of the invention, inoperative and vertically adjusted positions of a wheel and tire assembly being shown in full and chain-dotted lines, respectively.

FIGURE 2 is a vertical cross-section of the machine substantially as viewed on the line 2—2 of FIGURE 1, and partly broken away and in section, to show the improved wheel and tire-gauging means.

FIGURE 3 is a view corresponding to FIGURE 2, but substantially as viewed on the line 2—2 of FIGURE 1, to show the improved bead loosening tool.

FIGURE 4 is a perspective view of the machine, generally corresponding to FIGURE 1, but showing the same with the wheel and tire assembly elevated to a position in which one tire bead has been freed from its rim seat.

Referring to the drawings generally, there is illustrated a tire-changing machine 10 in which is incorporated a bead-breaker unit 11 having a generally U-shaped framework 12 comprising a suitable base 13 and laterally spaced uprights 14 and 15 affixed to opposite sides thereof. Pivoted to lugs 16, 16 on the forward portions the base 13 may be a forwardly extending foot treadle 17 having a pair of laterally spaced inwardly presented arm extensions 18, 18 between the inner ends of which side plates 19, 19 of a rectangular cradle 20 are pivotally connected at the transverse center of the same, as indicated at 21 in FIGURES 2 and 3. Transversely spaced cross-bars or rods 23, 23 rigidly connected to the side plates 19 carry elongated sleeves or rollers 24, 24 between which a tire T of a wheel assembly W may be cradled against uncontrolled rolling movement, as shown in FIGURES 1, 2, and 4, in all positions of vertical movement of the cradle. The weight of the wheel assembly W on the cradle, however, normally tends to lower the cradle 20, whereas the weight of the treadle 17 is such that it will tend to elevate the unloaded cradle (see full and chain-dotted positions in FIGURE 2). The cradle 20 is maintained horizontal in all positions of vertical movement thereof as by means of an upstanding rigid bar 25 affixed to one side plate 19 of the cradle, for vertical sliding reception through a guide bracket 27 on a cross-plate 28 affixed across the upright 14 (see FIGURES 1 and 2). In an up position of the cradle (best shown in full lines in FIGURE 2), the treadle 17 is inclined toward the floor to facilitate rolling the wheel assembly onto or off the cradle. To this end, portions of the arm extensions 18 are engageable with the base member 13 to limit upward movement of the treadle 17 (see FIGURE 2). When the cradle is loaded it will normally be allowed to drop down to the full line position shown in FIGURES 1 and 2, to enable the operator to generally align the left tire sidewall with a downwardly presented edge 30a of a spring-pressed stop plate or member 30, which may be hinged at 28a to the cross-plate 28. Accordingly, upon depressing treadle with one foot, the operator may elevate the loaded cradle toward positive stop engagement of a corresponding rim lip L with the edge 30a of stop plate 30, as shown in chain-dotted lines in FIGURE 1. This movement is made more positive by means of a cam plate 31 affixed on the guide member 30, to provide convex cam surface 31a which is outwardly offset with respect to the stop edge 30a, and otherwise adapted to be engaged by the adjacent sidewall of the tire as the tire is moved upwardly on the cradle, and thereby to guide and adjust the wheel assembly laterally until said lip L comes into said stop engagement with the stop edge 30a. As the vertical height or location of the stop edge or shoulder 30a is fixed, and the lip L always moves vertically to a fixed stop position against it, the peripheral area of the opposite tire sidewall immediately below the opposite rim lip portion L will always be in the same position and vertical relationship thereto, regardless of varying sizes of the wheel assembly components within a substantial range thereof. Accordingly, a fish-tail type tire tool 33 is swively mounted for limited floating movement on the free end of a rod 34, received through a suitable guide bearing means 35 on the frame upright 15 for reciprocation toward and from a point short of said stop means 30, so that said tool 33 is forcibly engageable with a substantial peripheral area of the tire sidewall immediately adjacent or below the rim lip L.

For so reciprocating the bead breaker or tool 33, the rod means 34 may be suitably connected to the movable inner end of a fabric-reinforced rubber bellows or inflatable bag means 35, the outer end of which is affixed to a horizontally disposed, U-shaped frame 36a mounted on the upright 15. The frame 36a may have a housing 36 removably associated with the same to cover the bellows 35.

As best shown in FIGURE 1, a free inner end 34a of rod 34 may be loosely received within a socket 37 and pivoted on a pin 38 therethrough for somewhat slight upward swinging movement of the tool against the action of a pair of tension springs 39, 39, which are suitably connected between the respective sides of frame 36a and clips or arms 40 suitably connected to the pin 38 for that purpose. Accordingly, upon momentary inflation and deflation of the bellows 35 to expand and contract the same, the rod is first moved inward, yieldingly to engage the tire sidewall of the elevated wheel assembly, and to depress the corresponding tire bead portion with sufficient force to release the tire bead from its rim seat substantially in the manner shown in FIGURE 4. The return strokes of the rod 34 are aided by the tension springs 39.

Inflation and deflation of the bellows or bag means for the foregoing purposes may be accomplished by pressing a button B of a suitable two-way control valve in a pressure regulated system of the type disclosed in copending patent application Ser. No. 474,021, filed July 22, 1965, in which applicant herein is a co-inventor. By depressing button B, the bellows may be inflated with pressurized air, for example, and held in expanded condition until the button is released to contract the bellows by exhausting the air therefrom through a suitable quick-acting exhaust valve (not shown).

In operation of the improved bead breaker machine, the operator simply rolls a wheel and tire assembly W along the floor, up the normally inclined foot treadle 17, and onto the normally elevated cradle 20, where the assembly vertically centers itself between the rollers 24, as shown in full lines in FIGURE 2. The weight of the assembly W is allowed to lower the cradle to the full line positions shown in FIGURES 1 and 2, while or until the operator adjusts the assembly to the left as viewed in FIGURE 1, to approximate vertical alignment of the left-hand rim lip L with the stop shoulder 30a.

Next, the operator depresses the treadle 17 to elevate the loaded cradle 20 to the chain-dotted position of FIGURE 2, until the cam portion 31a yieldingly engages the left-hand tire sidewall and guides the corresponding rim lip L into positive stop engagement with the stop shoulder 30a. This aligns a peripheral area of the opposite or right-hand tire sidewall portion, immediately below the corresponding rim lip, with the retracted breaker tool 33 as shown in relation to the chain-dotted position of the wheel assembly in FIGURE 1.

The operator now depresses the two-way control valve button B to inflate and expand the bellows 35, and thereby thrust the rod 34 inward to yielding engagement of a curved edge 33a of the tool 33 with a said peripheral area of the tire sidewall closely adjacent the rim lip L, as viewed in FIG. 4. As pressure is initially applied in this manner the tool will tilt on the pivot pin 28, which allows the curved edge 33a of the tool to turn radially outwardly and engage behind the rim lip for more positive pressure against the tire bead for breaking the seal between the bead and the rim seat. Upon release of the button B the reverse of the above tilting movement of the tool takes place as it is withdrawn to the inoperative position thereof shown in FIGURE 1, aided by the springs 39, as previously described.

The tire may now be rolled back off the cradle 20 and down the ramp 17 for a repeat of the above procedure to break the seal of the other tire bead from its rim seat, after which the tire is easily removed from the wheel rim in known manner with suitable tools. Tire removing and/or remounting operations may be accomplished, for example, on an auxiliary turntable device of the type shown at the upper left of FIGURE 1.

Modifications of the invention may be resorted to without departing from the spirit thereof or the scope of the appended claims.

What is claimed is:

1. A machine for breaking the seals between pneumatic tire beads and the wheel rim seats thereof, in a tire and wheel assembly in which the rim has axially opposite rim flange portions, comprising: a framework; a relatively fixed stop member on said framework and having a rim-engaging part thereon; a tire engaging tool; power means on said framework for reciprocation of said tool in directions toward and from a point laterally spaced from said rim-engaging part; a vertically movable cradle for supporting the tire and wheel assembly thereon in upright relation intermediate said stop member and said tool to have a peripheral rim flange portion positioned below said rim-engaging part; means for elevating said cradle while said assembly is retained thereon in upright relation until said rim flange portion comes into stop engagement with said rim-engaging part, thereby to align said reciprocable tool with an exposed given portion of the tire sidewall adjacent the opposite rim flange portion; whereby upon reciprocation of said tool the same is engageable with said given portion of the tire sidewall to break the seal of the corresponding bead with its rim seat.

2. A machine as in claim 1, said cradle having means for maintaining the same in vertically movable relationship, and a pivoted foot treadle provided with inward arm extension means pivotally connected to said cradle, whreeby the movement of the cradle is accomplished by foot pressure applied to said treadle.

3. A machine as in claim 2, the effective weight of said treadle being such that in a normal elevated position of the cradle, said treadle is forwardly inclined to facilitate rolling a wheel and tire assembly onto the cradle; the weight of the loaded cradle tending to lower the same and elevate the treadle, whereby upon application of foot pressure to the treadle the loaded cradle is elevated to accomplish said stop engagement of the rim flange portion with said rim-engaging part.

4. A machine as in claim 3, said tool being yieldingly movably mounted on said free end of the rod and having portions engageable with the tire along a substantial extent adjacent said opposite rim flange portion.

5. A machine as in claim 4, said power means including fluid pressure expansible bag means operable to reciprocate said rod.

6. A machine as in claim 1, said stop member having a guide portion engageable with the tire sidewall when the cradle is elevated for self-adjustment of the wheel assembly laterally into stop engagement of said guide portion with said rim flange portion.

7. A machine as in claim 1, said power-operated means including a rod reciprocably mounted on said framework and having an end extending freely toward said stop member, and power means for reciprocating the rod; said tool being mounted on the free end of said rod.

8. A machine as in claim 1, said power means including a rod reciprocably mounted on said framework and having an end extending freely toward said stop member, and actuating means for reciprocating the rod; said tool being mounted on the free end of said rod; said tool being angularly adjustably mounted on said free end of the rod and having portions engageable with the tire along a substantial extent adjacent said opposite rim flange portion.

9. A machine as in claim 1, said power means including a rod reciprocably mounted on said framework and having an end extending freely toward said stop memebr, and actuating means for reciprocating the rod; said tool being mounted on the free end of said rod; said actuating means including fluid pressure expansible bag means operable to reciprocate said rod.

References Cited

UNITED STATES PATENTS

| | | | |
|---|---|---|---|
| 2,521,149 | 9/1950 | Butler et al. | 157—1.2 |
| 2,783,830 | 3/1957 | Pozerycki et al. | 157—1.24 |
| 2,832,400 | 4/1958 | Laughlin | 157—1.28 |
| 2,840,143 | 6/1958 | Skiles | 157—1.26 |
| 3,033,268 | 5/1962 | Schaevitz | 157—1.26 |
| 3,362,453 | 1/1968 | Nester | 157—1.17 |

GRANVILLE Y. CUSTER, JR., *Primary Examiner.*